(12) United States Patent
Veersé

(10) Patent No.: US 9,087,167 B2
(45) Date of Patent: Jul. 21, 2015

(54) PREDICTION OF CIRCUIT PERFORMANCE VARIATIONS DUE TO DEVICE MISMATCH

(75) Inventor: Fabrice Alain Robert Veersé, La Rochette (FR)

(73) Assignee: Mentor Graphics Corporation, Wilsonville, OR (US)

( * ) Notice: Subject to any disclaimer, the term of this patent is extended or adjusted under 35 U.S.C. 154(b) by 446 days.

(21) Appl. No.: 13/546,962

(22) Filed: Jul. 11, 2012

(65) Prior Publication Data

US 2013/0018645 A1 Jan. 17, 2013

Related U.S. Application Data

(60) Provisional application No. 61/506,633, filed on Jul. 11, 2011.

(51) Int. Cl.
*G06F 17/50* (2006.01)

(52) U.S. Cl.
CPC ........ *G06F 17/5036* (2013.01); *G06F 2217/10* (2013.01)

(58) Field of Classification Search
USPC .................................................. 703/2, 13, 19
See application file for complete search history.

(56) References Cited

U.S. PATENT DOCUMENTS

| | | | |
|---|---|---|---|
| 8,204,730 B2 * | 6/2012 | Liu et al. ......................... | 703/13 |
| 2009/0228250 A1* | 9/2009 | Phillips ............................. | 703/2 |
| 2009/0306953 A1* | 12/2009 | Liu et al. ......................... | 703/14 |
| 2010/0017186 A1 | 1/2010 | Kim et al. | |

OTHER PUBLICATIONS

BSIM4 manual. Department of Electrical and Computer Science, University of California, Berkeley (2000). http://www-device.EECS.Berkeley.EDU/~bsim.

Oehm, J., Schumacher, K.: Quality Assurance and Upgrade of Analog Characteristics by Fast Mismatch Analysis Option in Network Analysis Environment. IEEE J. Solid-State Circuits, 28(7), 865-871 (1997).

Director, S.W. Rohrer, R.A.: Generalized Adjoint Network and Network Sensitivities. IEEE Trans. on Circuit Theory, 16(8), 318-323 (1969).

Ilievski, Z., Xu, H., Verhoeven, A., Schilders, W.H.A., Mattheij, R.M.M.: Adjoint Transient Sensitivity Analysis in Circuit Simulation. In G. Ciuprina, D. Ioan (eds.) Scientific Computing in Electrical Engineering SCEE 2006, Mathematics in Industry, vol. 11, pp. 183-189. Springer, Berlin Heidelberg New York (2007).

(Continued)

*Primary Examiner* — Thai Phan

(57) ABSTRACT

Aspects of the invention relate to techniques for predicting circuit performance variations due to device mismatch. Circuit simulation is performed to generate circuit simulation results based on a circuit description and information of circuit element parameters. Based on the simulation results, sensitivity information for the circuit design and current/charge deviations caused by individual circuit element parameter variations may be computed. Based on the sensitivity information and the current/charge deviations, steady-state mismatch effect information is determined. The determination may comprise first computing output parameter deviations caused by the individual variations of the circuit element parameters and then computing a total output parameter deviation based on the output parameter deviations.

18 Claims, 4 Drawing Sheets

(56) References Cited

OTHER PUBLICATIONS

Ilievski, Z.: Model Order Reduction and Sensitivity Analysis. Ph.D. thesis. Eindhoven University of Technology (2010). URL http://alexandria.tue.nl/extra2/201010770.pdf.

Graupner, A., Schwarz, W., Schuffny R: Statistical Analysis of Analog Structures Through Variance Calculation. IEEE Trans. Circ. Syst. I: Fund. Theory and Apply., 49(8), 1071-1078 (2002).

Hausler, R., Kinzelbach, H.: Sensitivity-based Stochastic Analysis Method for Power Variations. In: Proceedings of the 9. ITG/GMM-Fachtagung Entwicklung von Analogschaltung mit CAE-Methoden (ANALOG'06), Dresden, Germany, Sep. 27-29, ITG-FB report, 196, VDE Verlag, Berlin Offenbach (2006).

Yuan, F.: Analysis of Stochastic Behaviour of Linear Circuits Using First-Order Second-Moment and Adjoint Network Techniques. Electronic Letters, 33(9), 766-768 (1997).

Gu, B. Gullapalli, K., Zhang, Y., Sundareswaran, S.: Faster Cell Characterization Using Adjoint Sensitivity Analysis. In: Proceedings of the IEEE 2008 Custom Integrated Circuits Conference (CICC), pp. 229-232, San Jose, CA, Sep. 21-24, 2008.

Kim, J., Jones, K.D., Horowitz, M.A.: Fast, Non-Monte Carlo Estimation of Transient Performance Variation Due to Device Mismatch. In: Proceedings of the 44th ACM/IEEE Design Automation Conference (DAC'07), pp. 440-443, San Diego, CA, Jun. 4-8, 2007.

Nastov, O.J., Telichevsky, R., Kundert, K,. White, J.: Fundamentals of Fast Simulation Algorithms for RF Circuits. Proceedings of the IEEE, 95(3), 600-621 (2007).

Pelgrom, M., Duinmaijer, A., Webers, A.: Matching Properties of MOS Transistors. IEEE J. of Solid-State Circuits, 24(5), 1433-1439 (1989).

Ye, X., Li, P., Liu, F.Y.: Exact Time-Domain Second-Order Adjoint-Sensitivity Computation for Linear Circuit Analysis and Optimization. IEEE Trans. on Circuits and Systems-I: Regular Papers, 57(1), 236-248 (2010).

Zhang, M., Olbrich, M., Seider, D., Frerichs, M., Kinzelbach, H., Barke, E.: CMCal: An Accurate Analytical Approach for the Analysis of Process Variations with Non-Gaussian Parameters and Nonlinear Functions. In: Proceedings of the Design, Automation & Test in Europe Conference 2007 (DATE'07), pp. 1-6, Apr. 16-20, Nice, France (2007).

Kingel, P.: Device Mismatch and Tradeoffs in the Design of Analog Circuits. In: IEEE Journal of Solid-State Circuits, vol. 40 No. 6, pp. 1212-1224, Jun. 2005.

Orshansky, M., Milor, L., Chen, P., Keutzer, K., Hu, C.: Impact of Spatial Intrachip Gate Length Variability on the Performance of High-Speed Digital Circuits. In: IEEE Transactions on Computer-Aided Design of Integrated Circuits and Systems, vol. 21, No. 5, pp. 544-553, May 2002.

Rodrigues, S., Bhat, M.S.: Impact of Process Variation Induced Transistor Mismatch on Sense Amplifier Performance. in Advanced Computing and Communications, 2006. pp. 497-502, ADCOM 2006.

Kinget, P., Steyaert, M.: Impact of Transistor Mismatch on the Speed-Accuracy-Power Trade-Off of Analog CMOS Circuits. In: IEEE Custom Integrated Circuits Conference, pp. 333-336, 1996.

Masuda, H., Ohkawa, S.-I., Kurokawa, A., Aoki, M.: Challenge: Variability Characterization and Modeling for 65- to 90-nm Processes. , pp. 593-600, in IEEE 2005 Custom Integrated Circuits Conference.

\* cited by examiner

PREDICTION OF CIRCUIT PERFORMANCE VARIATIONS DUE TO DEVICE MISMATCH

RELATED APPLICATIONS

This application claims priority to U.S. Provisional Patent Application No. 61/506,633, entitled "Sensitivity-Based Steady-State Mismatch Analysis For Rf Circuits," filed on Jul. 11, 2011, and naming Fabrice Veersé as inventor, which application is incorporated entirely herein by reference.

FIELD OF THE INVENTION

The present invention relates to the field of integrated circuit (IC) design and process technology. Various implementations of the invention may be particularly useful for predicting circuit performance variations due to device mismatch.

BACKGROUND OF THE INVENTION

Device parameters of two identically designed devices in an integrated circuit may show a variation after fabrication. The variation is called device mismatch. For transistors, device mismatch may include variations of device parameters such as gate length and width, gate oxide thickness, threshold voltage, and doping levels. Device mismatch can have a significant impact on circuit performance such as speed, accuracy and power consumption. A recent statistical analysis of experimental data revealed that a 30% variation (3σ) of transistors' drive-current within a chip causes an equal variation in the circuit signal propagation delay. With the continuing scaling of semiconductor processes, the problems of circuit performance variations due to device mismatch are becoming more pronounced. Furthermore, these problems can be amplified by the low-power and low-voltage operation preferred in commercial electronic products.

It is thus important for circuit designers to be able to predict circuit performance variations due to device mismatch. A conventional way of estimating the statistical distribution of circuit performance (mismatch analysis) is the Monte Carlo analysis. In the Monte Carlo analysis, device mismatch is modeled as a set of randomly generated samples that represent the probability distributions of device parameters. The circuit is then repetitively simulated with the random device samples and the statistics of the resulting performance are collected. One major drawback of this approach is the large number of circuit simulations needed. This number can be over hundreds to thousands. Another conventional way of the mismatch analysis, the worst case analysis, also suffers from the same problem. The number of simulations required by the worst case analysis is largely dependent on the number of device parameters. A recent study reported the number of the required simulations can exceed eight hundred.

For practical applications, methods of mismatch analysis that do not require repeated circuit simulations are highly desirable.

BRIEF SUMMARY OF THE INVENTION

Aspects of the invention relate to techniques for predicting circuit performance variations due to device mismatch. According to various implementations of the invention, circuit simulation is performed to generate circuit simulation results based on a circuit description of a circuit design that comprises circuit elements and information of circuit element parameters. The circuit description may be in the form of a transistor-level netlist. The information of circuit element parameters may comprise nominal circuit element parameter values, which may be computed based on a statistics model for circuit element parameter variations. The circuit simulation may employ a harmonic balance method.

Based on the simulation results, sensitivity information for the circuit design may be computed. The sensitivity information may comprise adjoint sensitivity information. The adjoint sensitivity information may be obtained by solving an adjoint system involving a harmonic-balance Jacobian matrix.

Also based on the simulation results, current/charge deviations caused by individual circuit element parameter variations may be computed. The simulation results may comprise nominal current/charge values for the circuit elements. Accordingly, the current/charge deviations are computed with respect to the nominal current/charge values.

Based on the sensitivity information and the current/charge deviations, steady-state mismatch effect information is determined. The determination may comprise first computing output parameter deviations caused by the individual variations of the circuit element parameters based on the sensitivity information and the current/charge deviation and then computing a total output parameter deviation based on the output parameter deviations. The total output parameter deviation computation may comprise calculating square root of the sum of the squares of the output parameter deviations.

DETAILED DESCRIPTION OF THE INVENTION

General Considerations

Figure 1:
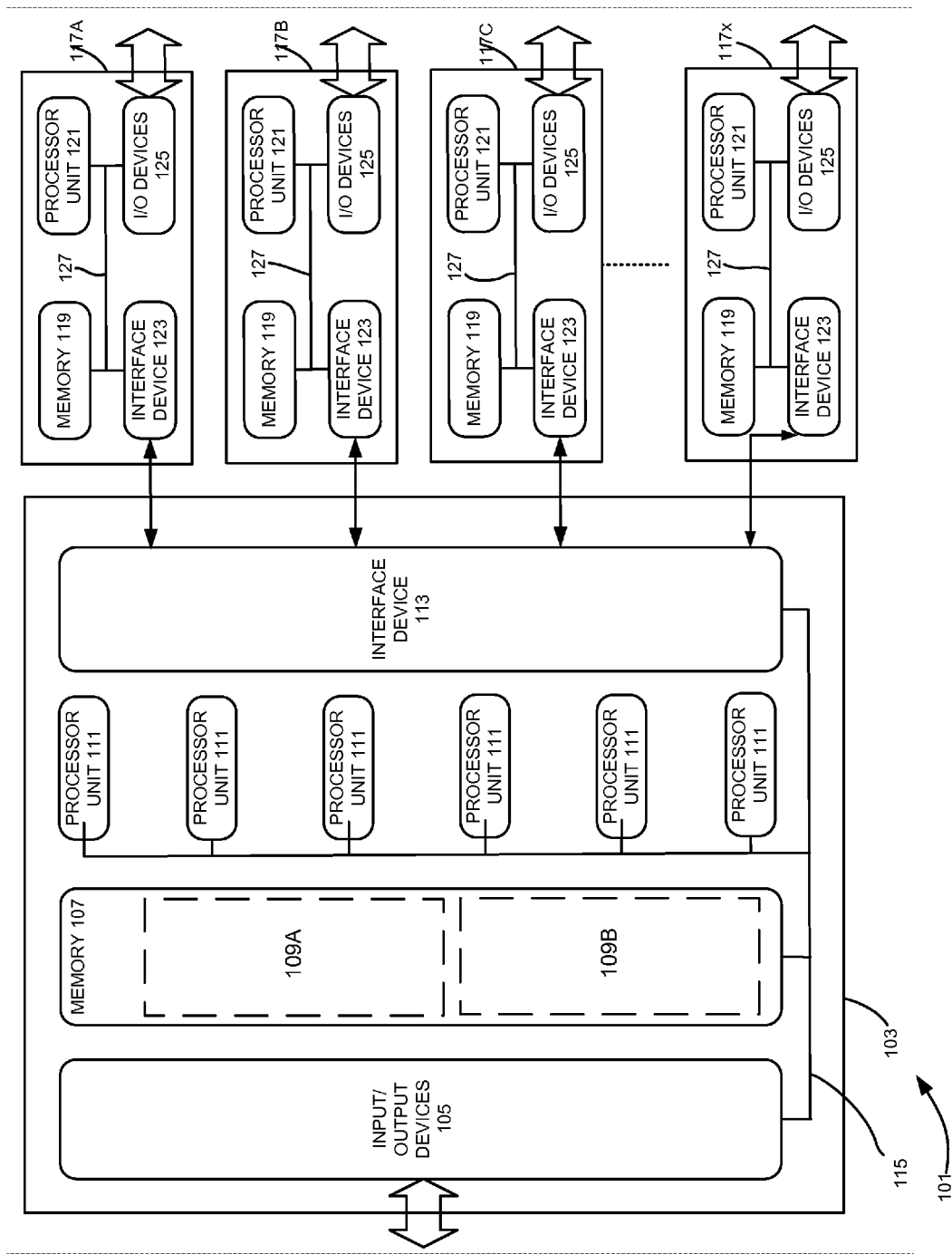
FIG. 1 illustrates an example of a computing system that may be used to implement various embodiments of the invention.

Various aspects of the present invention relate to predicting circuit performance variations due to device mismatch. In the following description, numerous details are set forth for the purpose of explanation. However, one of ordinary skill in the art will realize that the invention may be practiced without the use of these specific details. In other instances, well-known features have not been described in details to avoid obscuring the present invention.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "perform," "compute" and "determine" to describe the disclosed methods. Such terms are high-level abstractions of the actual operations that are performed. The actual operations that correspond to these terms will vary depending on the particular implementation and are readily discernible by one of ordinary skill in the art.

Also, as used herein, the term "design" is intended to encompass data describing an entire integrated circuit device. This term also is intended to encompass a smaller group of data describing one or more components of an entire device, however, such as a portion of an integrated circuit device. Still further, the term "design" also is intended to encompass data describing more than one microdevice, such as data to be used to form multiple microdevices on a single wafer.

Illustrative Operating Environment

The execution of various electronic design automation processes according to embodiments of the invention may be implemented using computer-executable software instructions executed by one or more programmable computing devices. Because these embodiments of the invention may be implemented using software instructions, the components and operation of a generic programmable computer system on which various embodiments of the invention may be employed will first be described. Further, because of the complexity of some electronic design automation processes and the large size of many circuit designs, various electronic design automation tools are configured to operate on a computing system capable of simultaneously running multiple processing threads. The components and operation of a computer network having a host or master computer and one or more remote or servant computers therefore will be described with reference to FIG. 1. This operating environment is only one example of a suitable operating environment, however, and is not intended to suggest any limitation as to the scope of use or functionality of the invention.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the invention. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
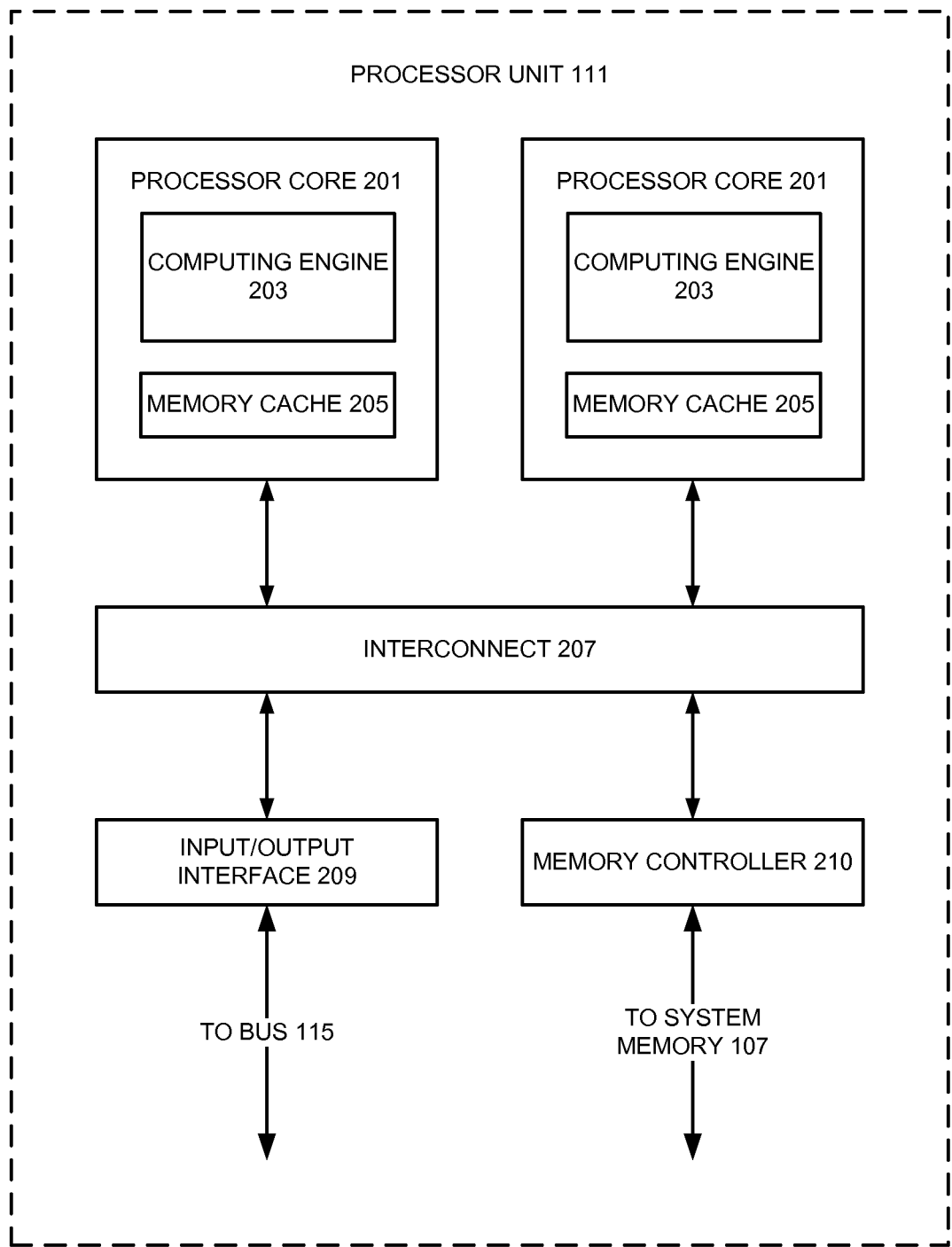
FIG. 2 illustrates an example of a multi-core processor unit that may be used to implement various embodiments of the invention.

With some implementations of the invention, the master computing device 103 may employ one or more processing units 111 having more than one processor core. Accordingly, FIG. 2 illustrates an example of a multi-core processor unit 111 that may be employed with various embodiments of the invention. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 111. With some processor cores 201, such as the Cell microprocessor created by Sony Corporation, Toshiba Corporation and IBM Corporation, the interconnect 207 may be implemented as an interconnect bus. With other processor units 111, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 210. The input/output interface 209 provides a communication interface between the processor unit 111 and the bus 115. Similarly, the memory controller 210 controls the exchange of information between the processor unit 111 and the system memory 107. With some implementations of the invention, the processor units 111 may include additional components, such as a high-level cache memory accessible shared by the processor cores 201.

While FIG. 2 shows one illustration of a processor unit 111 that may be employed by some embodiments of the invention, it should be appreciated that this illustration is representative only, and is not intended to be limiting. For example, some embodiments of the invention may employ a master computer 103 with one or more Cell processors. The Cell processor employs multiple input/output interfaces 209 and multiple memory controllers 210. Also, the Cell processor has nine different processor cores 201 of different types. More particularly, it has six or more synergistic processor elements (SPEs) and a power processor element (PPE). Each synergistic processor element has a vector-type computing engine 203 with 428×428 bit registers, four single-precision floating point computational units, four integer computational units, and a 556 KB local store memory that stores both instructions and data. The power processor element then controls that tasks performed by the synergistic processor elements. Because of its configuration, the Cell processor can perform some mathematical operations, such as the calculation of fast Fourier transforms (FFTs), at substantially higher speeds than many conventional processors.

It also should be appreciated that, with some implementations, a multi-core processor unit 111 can be used in lieu of multiple, separate processor units 111. For example, rather than employing six separate processor units 111, an alternate implementation of the invention may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the servant computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the servant computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each servant computer 117 may include a memory 119, a processor unit 121, an interface device 123, and, optionally, one more input/output devices 125 connected together by a system bus 127. As with the master computer 103, the optional input/output devices 125 for the servant computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the invention, one or more of the processor units 121 may be a Cell processor. The memory 119 then may be implemented using any combination of the computer readable media discussed above. Like the interface device 113, the interface devices 123 allow the servant computers 117 to communicate with the master computer 103 over the communication interface.

In the illustrated example, the master computer 103 is a multi-processor unit computer with multiple processor units 111, while each servant computer 117 has a single processor unit 121. It should be noted, however, that alternate implementations of the invention may employ a master computer having single processor unit 111. Further, one or more of the servant computers 117 may have multiple processor units 121, depending upon their intended use, as previously discussed. Also, while only a single interface device 113 or 123 is illustrated for both the master computer 103 and the servant computers, it should be noted that, with alternate embodiments of the invention, either the computer 103, one or more of the servant computers 117, or some combination of both may use two or more different interface devices 113 or 123 for communicating over multiple communication interfaces.

With various examples of the invention, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the invention, one or more of the servant computers 117 may alternately or additionally be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the invention.

Harmonic-Balance Steady-State Sensitivity Analysis

It is often important in RF (radio frequency) design to find the periodic steady state of a circuit driven by one or more periodic inputs. For example, a power amplifier driven to saturation by a large single-tone input is operating in a periodic steady state. A variant is the quasi-periodic steady state. A circuit driven by more than one signal tone may reach a quasi-periodic steady state.

For (quasi-) periodic steady-state circuit simulations, harmonic balance is one of the conventional methods that are often used. Using harmonic balance, the computation of a circuit's (quasi-) periodic steady-state amounts to solving a nonlinear system of equations:

$$F(X_{HB}(p),p) = \Omega \Gamma Q(\Gamma^{-1} X_{HB}(p),p) + \Gamma I(\Gamma^{-1} X_{HB}(p),p) + Y(p) X_{HB}(p) + B = 0, \quad (1)$$

where $\Gamma$ and $\Gamma^{-1}$ are the direct and inverse Fourier transforms, $\Omega$ is a diagonal matrix expressing the equivalent of time-differentiation in frequency domain, Q and I are vectors gathering the instantaneous charges $q(x_{HB}(t_i, p), p)$ and currents $i(x_{HB}(t_i, p), p)$, with $x_{HB}(p) = \Gamma^{-1} X_{HB}(p)$ being the steady-state unknowns in time domain. The steady-state unknowns can be voltages. The Y(p) matrix accounts for the frequency-dependent elements and B is the vector of harmonic components of independent sources. The p represents device parameters such as transistor gate widths and lengths.

Partial differentiation of this nonlinear system of equations (Eq. (1)) with respect to $X_{HB}$ leads to the following expression of the harmonic-balance Jacobian matrix:

$$J(X_{HB}(p),p) = \Omega \Gamma C(x_{HB}(p),p)\Gamma^{-1} + \Gamma G(x_{HB}(p),p)\Gamma^{-1} + Y(p) \quad (2)$$

where $C(x_{HB}(p), p)$ and $G(x_{HB}(p), p)$ are block-diagonal matrices with entries $\partial q(x_{HB}(t_i,p),p)/\partial x$ and $\partial i(x_{HB}(t_i, p), p)/\partial x$ respectively.

Differentiation of this nonlinear system of equations (Eq. (1)) with respect to the parameters p, leads to:

$$J(X_{HB}(p), p)\frac{dX_{HB}(p)}{dp} + \frac{\partial F(X_{HB}(p), p)}{\partial p} = 0. \quad (3)$$

The sensitivity of an output parameter expression $g(X_{HB}(p), p)$ with respect to the parameters p is given by:

$$\frac{dg(X_{HB}(p), p)}{dp} = \frac{\partial g(X_{HB}(p), p)}{\partial X_{HB}}\frac{dX_{HB}(p)}{dp} + \frac{\partial g(X_{HB}(p), p)}{\partial p} \quad (4)$$

Eq. (4) may be rewritten by using Eq. (3) left-multiplied by w* where the * superscript denotes conjugate transposition and w is the solution of the adjoint system $$[J(X_{HB}(p), p)]^* w = \left(\frac{\partial g(X_{HB}(p), p)}{\partial X_{HB}}\right)^*, \quad (5)$$

Substitution of the first term on the right-hand side of Eq. (4) based on Eqs. (3) and (5) derives:

$$\frac{dg(X_{HB}(p), p)}{dp} = -w^* \frac{\partial F(X_{HB}(p), p)}{\partial p} + \frac{\partial g(X_{HB}(p), p)}{\partial p} \quad (6)$$

Eq. (5) shows that if w is known, the sensitivity of the output parameter $g(X_{HB}(p), p)$ with respect to the parameter vector p can be computed. Here, w is referred to as adjoint sensitivity information.

Steady-State Mismatch Analysis

Based on the adjoint sensitivity information and statistical deviations of device parameters, the steady-state device mismatch analysis may be conducted. An output parameter of interest $y = g(X_{HB}(p), p)$ (e.g. output voltage) usually depends on the device parameters p only implicitly through the dependence of the circuit steady-state vector $X_{HB}(p)$, i.e., $\partial g/\partial p = 0$. Assuming that the parameters p are unbiased ($\bar{p} = E(p) = 0$) and given their covariance matrix $\Sigma_p = E((p-\bar{p})(p-\bar{p})^T)$, the first-order approximation can be expressed as:

$$\Sigma_y = E((y-\bar{y})(y-\bar{y})^T) \approx (dg/dp)\Sigma_p(dg/dp)^T. \quad (7)$$

Eq. (7) indicates the covariance matrix of the output parameter, $y = g(X_{HB}(p))$, may be estimated from the covariance matrix of the device parameters p and the sensitivity of this output parameter with respect to these device parameters. Assuming the device parameters are uncorrelated, Eq. (7) is reduced to:

$$\sigma_y = \sqrt{\sum_i \left(\frac{dg}{dp_i}\right)^2 \sigma_{p_i}^2} = \sqrt{\sum_i \left(\frac{dg}{dp_i}\sigma_{p_i}\right)^2} \quad (8)$$

where $\sigma_z$ indicates the standard deviation of the quantity z and the summation extends over the number of individual device parameters $p_i$.

Let $p_i$ be a device parameter for a transistor (e.g. its gate width or length). Due to $\partial g/\partial p = 0$, Eq. (6) for steady-state sensitivity can be reduced to:

$$\frac{dg}{dp_i}\sigma_{p_i} = -w^* \left(\Omega\Gamma\frac{\partial Q(x_{HB}, p)}{\partial p_i}\sigma_{p_i} + \Gamma\frac{\partial I(x_{HB}, p)}{\partial p}\sigma_{p_i}\right) \quad (9)$$

where w is the adjoint sensitivity information that can be derived by solving the adjoint system, Eq. (5).

The term $(\partial Q/\partial p_i)\sigma_{p_i}$ in Eq. (9) may be obtained by determining the instantaneous deviations of charges $$\frac{\partial q(x_{HB}(t_j), p)}{\partial p_i}\sigma_{p_i} \approx [q(x_{HB}(t_j), p + \sigma_{p_i}e_i) - q(x_{HB}(t_j), p)] \quad (10)$$

for all the FFT sampling instants $t_j$. The current deviation term $(\partial I/\partial p_i)\sigma_{p_i}$ is treated similarly. This amounts to perturbing the device parameters for each instance of the corresponding device by a standard deviation and evaluating the resulting current and charges variations, for all instants $t_j$.

The mismatch analysis comprises computing the mismatch deviation $\sigma_y$. Besides the evaluation of the device parameters using Eq. (10) and corresponding one for the current deviation, the main computational cost of the mismatch analysis comprises solving the linear adjoint system Eq. (5).

If some device parameters are correlated, a principal component analysis (PCA) may be performed to identify uncorrelated linear combinations of the device parameters, and to perform the steady-state mismatch analysis using these combinations as independent device parameters. The global performance variation computed by the mismatch analysis can then account correctly for correlations between the original mismatch device parameters and the uncorrelated linear combinations of device parameters that contribute to this variation the most may then be identified.

Steady-State Mismatch Analysis Tools and Methods

Figure 3:
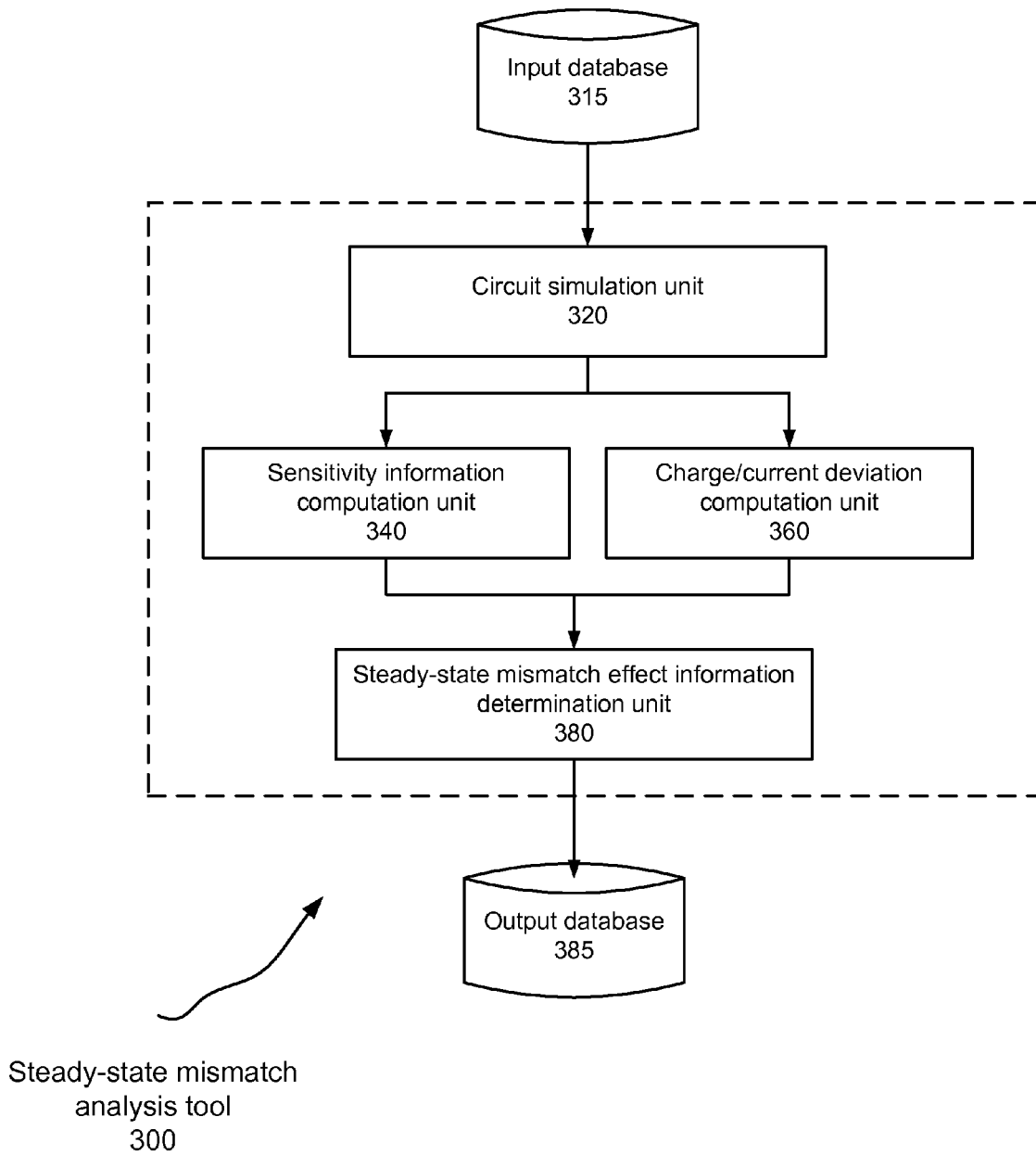
FIG. 3 illustrates a steady-state mismatch analysis tool that may be employed according to various embodiments of the invention.

FIG. 3 illustrates an example of a steady-state mismatch analysis tool according to various embodiments of the invention. As seen in the figure, the steady-state mismatch analysis tool 300 includes four units: a circuit simulation unit 320, a sensitivity information computation unit 340, a charge/current deviation computation unit 360 and a steady-state mismatch effect information determination unit 380. As will be discussed in more detail below, some implementations of the steady-state mismatch analysis tool 300 may cooperate with (or incorporate) one or both of an input database 315 and an output database 385. While the input database 315 and the output database 385 are shown as separate units in FIG. 3, a single data storage medium may be used to implement some or all of these databases.

According to some embodiments of the invention, one or more of the circuit simulation unit 320, the sensitivity information computation unit 340, the charge/current deviation computation unit 360 and the steady-state mismatch effect information determination unit 380 may be implemented by executing programming instructions on one or more programmable computers/computer systems, such as the computing system illustrated in FIG. 1 and FIG. 2. Correspondingly, some other embodiments of the invention may be implemented by software instructions, stored on a non-transitory computer-readable medium, for instructing one or more programmable computers/computer systems to perform the functions of one or more of the circuit simulation unit 320, the sensitivity information computation unit 340, the charge/current deviation computation unit 360 and the steady-state mismatch effect information determination unit 380. As used herein, the term "non-transitory computer-readable medium" refers to computer-readable medium that are capable of storing data for future retrieval, and not propagating electro-magnetic waves. The non-transitory computer-readable medium may be, for example, a magnetic storage device, an optical storage device, a "punched" surface type device, or a solid state storage device.

Figure 4:
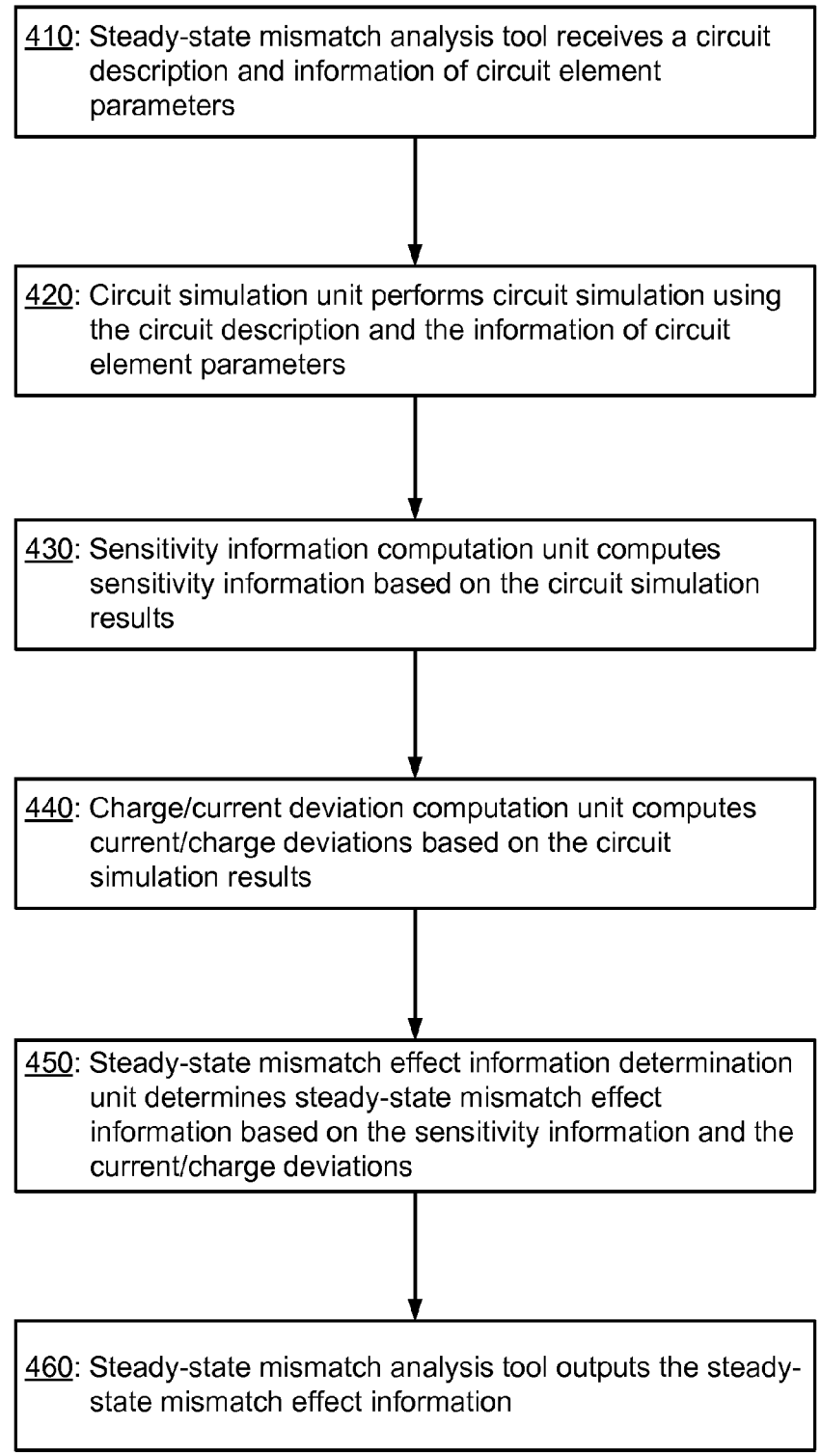
FIG. 4 illustrates a flowchart describing methods for steady-state mismatch analysis that may be employed by various embodiments of the invention.

For ease of understanding, steady-state mismatch analysis methods that may be employed according to various embodiments of the invention will be described with reference to the steady-state mismatch analysis tool 300 illustrated in FIG. 3 and the steady-state mismatch analysis method shown in the flow chart 400 in FIG. 4. It should be appreciated, however, that alternate implementations of a steady-state mismatch analysis tool may be used to the steady-state mismatch analysis method shown in the flow chart 400 according to various embodiments of the invention. In addition, it should be appreciated that implementations of the steady-state mismatch analysis tool 300 may be employed with other methods for steady-state mismatch analysis according to different embodiments of the invention.

Initially, in operation 410, the steady-state mismatch analysis tool 300 receives circuit description of a circuit that comprises circuit elements and information of circuit element parameters for the circuit elements. The circuit description may be in the form of a transistor-level netlist. The circuit elements may comprise devices in a circuit such as transistors. For transistors, circuit element parameters may comprise gate lengths. The circuit elements may also comprise resistors and capacitors. The information of circuit element parameters may comprise nominal circuit element parameter values, which may be computed based on a statistics model for circuit element parameter variations. One such statistics model is the Gaussian distribution. The information of circuit element parameters may also comprise circuit element parameter deviations such as those derived based on the Gaussian distribution.

Next, in operation 420, the circuit simulation unit 320 performs circuit simulation using the circuit description and the information of circuit element parameters to generate circuit simulation results. The circuit simulation may be a steady-state simulation based on harmonic balance (Eq. (1)). The circuit simulation unit 320 may employ the nominal circuit element parameter values for simulation. Accordingly, the simulation results may comprise nominal charge/current values associated with the circuit elements, e.g., at the pins of transistors.

Next, in operation 430, the sensitivity information computation unit 340 computes sensitivity information based on the circuit simulation results. The sensitivity information may comprise adjoint sensitivity information. The adjoint sensitivity information may be derived based on Eq. (5).

Operation 440 may be performed before, concurrently with, or after the operation 430. In operation 440, the charge/current deviation computation unit 360 computes, based on the circuit simulation results, current/charge deviations caused by individual circuit element parameter variations. The charge deviations may be calculated based on Eq. (10) while a similar equation may be used for calculating the current deviations. The charge/current deviations are with respect to the corresponding nominal charge/current values included in the simulation results.

Based on the sensitivity information and the current/charge deviations, the steady-state mismatch effect information determination unit 380 determines steady-state mismatch effect information. With various implementations of the invention, output parameter deviations caused by the individual variations of the circuit element parameters are first computed based on Eq. (9). Then, a total output parameter deviation is computed based on the output parameter deviations. In some embodiments of the invention, the total output parameter deviation computation comprises calculating square root of the sum of the squares of the output parameter deviations based on Eq. (8). The total output parameter deviation may be included in the steady-state mismatch effect information as the output of the steady-state mismatch analysis tool 300.

In operation 460, the steady-state mismatch analysis tool 300 outputs the derived steady-state mismatch effect information. For example, the steady-state mismatch effect information may be stored in one or more computer-readable storage media (e.g., volatile or nonvolatile memory or storage), as shown as the output database 385 in FIG. 3.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims For example, while specific terminology has been employed above to refer to electronic design automation processes, it should be appreciated that various examples of the invention may be implemented using any desired combination of electronic design automation processes.

What is claimed is:

1. One or more processor-readable storage media storing computer-executable instructions for causing one or more processors to perform a method, the method comprising:
   receiving a circuit description of a circuit design that comprises circuit elements and information of circuit element parameters for the circuit elements;
   performing circuit simulation using the circuit description and the information of circuit element parameters to generate circuit simulation results;
   computing sensitivity information based on the circuit simulation results;
   computing, based on the circuit simulation results, current/charge deviations caused by individual circuit element parameter variations;
   determining steady-state mismatch effect information based on the sensitivity information and the current/charge deviations; and
   outputting the steady-state mismatch effect information.

2. The one or more processor-readable storage media recited in claim 1, wherein the circuit description is a transistor-level netlist.

3. The one or more processor-readable storage media recited in claim 1, wherein the circuit simulation employs a harmonic balance method.

4. The one or more processor-readable storage media recited in claim 1, wherein the circuit simulation results comprise nominal current/charge values for the circuit elements, and the current/charge deviations are computed with respect to the nominal current/charge values.

5. The one or more processor-readable storage media recited in claim 1, wherein the sensitivity information comprises adjoint sensitivity information.

6. The one or more processor-readable storage media recited in claim 1, wherein the outputting comprises storing the steady-state mismatch effect information in computer memory or storage.

7. The one or more processor-readable storage media recited in claim 1, wherein the determining steady-state mismatch effect information comprises:
   computing output parameter deviations caused by the individual variations of the circuit element parameters based on the sensitivity information and the current/charge deviations; and
   computing a total output parameter deviation based on the output parameter deviations.

8. The one or more processor-readable storage media recited in claim 7, wherein the computing a total output parameter deviation comprises:
   calculating square root of the sum of the squares of the output parameter deviations.

9. The one or more processor-readable storage media recited in claim 1, wherein the information of circuit element parameters comprises nominal circuit element parameter values.

10. A method of mismatch analysis, comprising:
   with a computer,
      receiving a circuit description of a circuit design that comprises circuit elements and information of circuit element parameters for the circuit elements;
      performing circuit simulation using the circuit description and the information of circuit element parameters to generate circuit simulation results;
      computing sensitivity information based on the circuit simulation results;
      computing, based on the circuit simulation results, current/charge deviations caused by individual circuit element parameter variations;
      determining steady-state mismatch effect information based on the sensitivity information and the current/charge deviations; and
      outputting the steady-state mismatch effect information.

11. The method recited in claim 10, wherein the circuit description is a transistor-level netlist.

12. The method recited in claim 10, wherein the circuit simulation employs a harmonic balance method.

13. The method recited in claim 10, wherein the circuit simulation results comprise nominal current/charge values for the circuit elements, and the current/charge deviations are computed with respect to the nominal current/charge values.

14. The method recited in claim 10, wherein the sensitivity information comprises adjoint sensitivity information.

15. The method recited in claim 10, wherein the outputting comprises storing the steady-state mismatch effect information in computer memory or storage.

16. The method recited in claim 10, wherein the determining steady-state mismatch effect information comprises:
   computing output parameter deviations caused by the individual variations of the circuit element parameters based on the sensitivity information and the current/charge deviations; and
   computing a total output parameter deviation based on the output parameter deviations.

17. The method recited in claim 16, wherein the computing a total output parameter deviation comprises:
   calculating square root of the sum of the squares of the output parameter deviations.

18. The method recited in claim 10, wherein the information of circuit element parameters comprises nominal circuit element parameter values.

* * * * *